United States Patent
Vaishnav et al.

(10) Patent No.: US 10,235,476 B2
(45) Date of Patent: *Mar. 19, 2019

(54) MATCHING OBJECTS USING MATCH RULES AND LOOKUP KEY

(71) Applicant: salesforce.com, inc., San Francisco, CA (US)

(72) Inventors: Parth Vijay Vaishnav, Cupertino, CA (US); Chenghung Ker, Burlingame, CA (US); Danil Dvinov, San Francisco, CA (US); David Hacker, Arlington, VA (US)

(73) Assignee: salesforce.com, inc., San Francisco, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 14/723,866

(22) Filed: May 28, 2015

(65) Prior Publication Data

US 2016/0350440 A1  Dec. 1, 2016

(51) Int. Cl.
*G06F 17/30* (2006.01)

(52) U.S. Cl.
CPC .. *G06F 17/30979* (2013.01); *G06F 17/30303* (2013.01)

(58) Field of Classification Search
CPC ......... G06F 17/30979; G06F 17/30303; G06F 2207/025; G06F 19/707; G06N 5/04
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

OTHER PUBLICATIONS

U.S. Appl. No. 13/998,890.
U.S. Appl. No. 13/986,251, filed Apr. 16, 2013.

*Primary Examiner* — Jorge A Casanova
(74) *Attorney, Agent, or Firm* — Dergosits & Noah LLP; Todd A. Noah

(57) ABSTRACT

Some embodiments of the present invention include a method for identifying match candidates in a database object and may include generating, by a database system, a match key associated with a lookup field of a database object. The method may further include activating, by the database system, a matching rule associated with the match key, and receiving, by the database system, a request to search for duplicate candidates in the database object. The request may include an input entity. The duplicate candidates in the database object may be identified by using the input entity and the matching rule.

20 Claims, 14 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0199029 A1* | 12/2002 | Williamson ............... G06F 8/38 |
| | | 719/310 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0005546 A1* | 1/2007 | Law ........................ G06N 5/02 |
| | | 706/47 |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2010/0070460 A1* | 3/2010 | Furst ........................ G06N 5/04 |
| | | 707/602 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |

\* cited by examiner

400

| Match Rule | Keys |
|---|---|
| F1(R) F2(N) + F3(D) F4(R) | F1(R), F3(D)F4(R) |
| F1(D) F3(R) | F1(D)F3(R) |

| Record | F1(R) value | F3(D)F4(R) value |
|---|---|---|
| (F1=a, F2=b, F3=c, F4=d) | a | cd |
| (F1=null, F2=b, F3=null, F4=d) |  | "null"d |
| (F1=a, F2=b, F3=c, F4=null) | a |  |

| Object | F1 | F2 | F3 | F4 |
|---|---|---|---|---|
| X | a | b | null | d |
| Y | null | e | null | d |
| M | 3 | 0 | 1 | 2 |

| Index 421 | First Name 423 | Last Name 424 | Account Name 422 |
|---|---|---|---|
| 1 | Peter | Anderson | Salesforce.com |
| 2 | Cliff | Ker | Salesforce.com |
| 3 | Bill | Gate | Microsoft |

| Index 421 | First Name 423 | Last Name 424 | Account Name (lookup field) 426 |
|---|---|---|---|
| 1 | Parth | Vaishnav | 00FA (lookup value) |
| 2 | Cliff | Ker | 00FA (lookup value) |
| 3 | Bill | Gate | 00DE (lookup value) |

| Index | Account Name (lookup field) 426 | Look up key for lookup value 422 |
|---|---|---|
| 1 | 00FA (lookup value) | Salesforce.com (lookup key) |
| 2 | 00DE (lookup value) | Microsoft (lookup key) |

FIG. 4F

```
<!-- MATCHING RULE -->
<setupEntity name="MatchingRule" keyPrefix="0JD">           ← 508
    <setupField name="CustomEntityDefinition" enum="MatchEngine" />
    domain="CustomEntityDefinition" enum="MatchEngine" />
    <setupField name="BooleanFilter"          columnType="TEXT"
    <setupField name="Description"            columnType="MULTILINETEXT"
    <setupField name="ExternalRuleName"       columnType="TEXT"
510─<setupField name="IndexDefinition"        fieldType="FOREIGNKEY"
    domain="MatchIndexDefinition"
    <setupField name="RuleDeploymentState"    columnType="STATICENUM"
    enum="MatchRuleDeploymentState" dbValueRequired="true"/>
    <setupField name="LookupIndexDefinition"  fieldType="FOREIGNKEY"
    domain="MatchIndexDefinition" foreignKeyConstraint="LeaveDangling" />   ← 522
</setupEntity>  ─515                          520
        ↑
       525
```

FIG. 5A

```xml
<!-- MATCHING RULE ITEM -->
<setupEntity name="MatchingRuleItem" keyPrefix="0JE">
  <setupField name="MatchingRule"           fieldType="MASTERDETAIL" domain="MatchRule"
   aggregateRelationshipName="MatchRuleItems" />
    <setupField name="SortOrder"            columnType="INTEGER"
    <setupField name="ColumnEnumOrId"                                fieldType="ENUMORID"
   domain="CustomFieldDefinition,CustomFieldDataColumn" enum="MatchableField" />
    <setupField name="MatchOperation"       fieldType="ENUMORID"
   domain="CustomEntityDefinition" enum="MatchOperation" />
    <setupField name="Argument1"            columnType="TEXT"
    <setupField name="BlankValueBehavior"                            columnType="STATICENUM"
   enum="BlankValueBehavior"
    <setupField name="LookupEntityEnumOrId" fieldType="ENUMORID"
     domain="CustomEntityDefinition" enum="MatchableEntity"/>
</setupEntity>
```

FIG. 5B

```xml
<!-- MATCH INDEX -->
<setupEntity name="MatchIndexDefinition" keyPrefix="0JJ" >
  <setupField name="ValueGeneratorType"     fieldType="ENUMORID" domain="MatchRule"
   enum="MatchIndexValueGeneratorType"/>
    <setupField name="DeploymentState"      columnType="STATICENUM"
   enum="MatchIndexDeploymentState"
</setupEntity>
```

| ID | Boolean Filter | Index Id | Lookup Index Id | Engine | DeploymentState |
|---|---|---|---|---|---|
| 0JDx1 | 1 AND 2 AND 3 | 0JKx1 | 0JKx2 | Exact | Undeployed |

| MatchRule | Column | LookupEntity | SortOrder | Blank Value Behavior |
|---|---|---|---|---|
| 0JDx1 | FirstName | | 1 | Match Null |
| 0JDx1 | LastName | | 2 | Match Null |
| 0JDx1 | AccountId | Account | 3 | Match Null |

| ID | ValueGenerator | DeploymentState |
|---|---|---|
| 0JKx1 | 0JDx1 | Undeployed |
| 0JKx2 | 0JDx1 | Undeployed |

| IndexDefinitionId | EntityId | Name | Value |
|---|---|---|---|
| 0JKx2 | 001xA | 2 | salesforce.com |
| 0JKx2 | 001xB | 2 | salesforce.com |
| 0JKx2 | 001xC | 2 | microsoft |
| 0JKx2 | 001xD | 2 | oracle |
| 0JKx1 | 003xX | 012 | parth;vaishnav;001xA |
| 0JKx1 | 003xY | 012 | clifford;ker;001xB |
| 0JKx1 | 003xZ | 012 | bill;gates;001xC |

660 — 662 — 663 — 664 — 665 — 667 — 670 — 672 — 674 — 676

MATCHING OBJECTS USING MATCH RULES AND LOOKUP KEY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing, and more specifically relates to searching for duplicates using matching rules.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Database systems may include databases that have millions of records. To maintain the efficiency and integrity of the databases, matching rules may be used to identify duplicates. Further, database updates that involve millions of records may significantly affect the performance of the database system. As such, database designers continuously try to develop techniques that can improve the performance of the database as related to matching and updating.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

FIGS. 4A, 4B and 4C show example tables that depict keys and matching rules that may be applied to objects, in accordance with some embodiments.

FIGS. 4D, 4E and 4F show example tables that depict efficient updating field values in an object, in accordance with some embodiments.

FIGS. 5A, 5B and 5C show example matching rule, matching rule item and match index that depict using lookup fields to identify matching candidates, in accordance with some embodiments.

FIGS. 6A, 6B, 6C and 6D show example tables that depict identifying matching candidates using matching rule, lookup field, lookup value and lookup key, in accordance with some embodiments.

DETAILED DESCRIPTION

Figure 1:
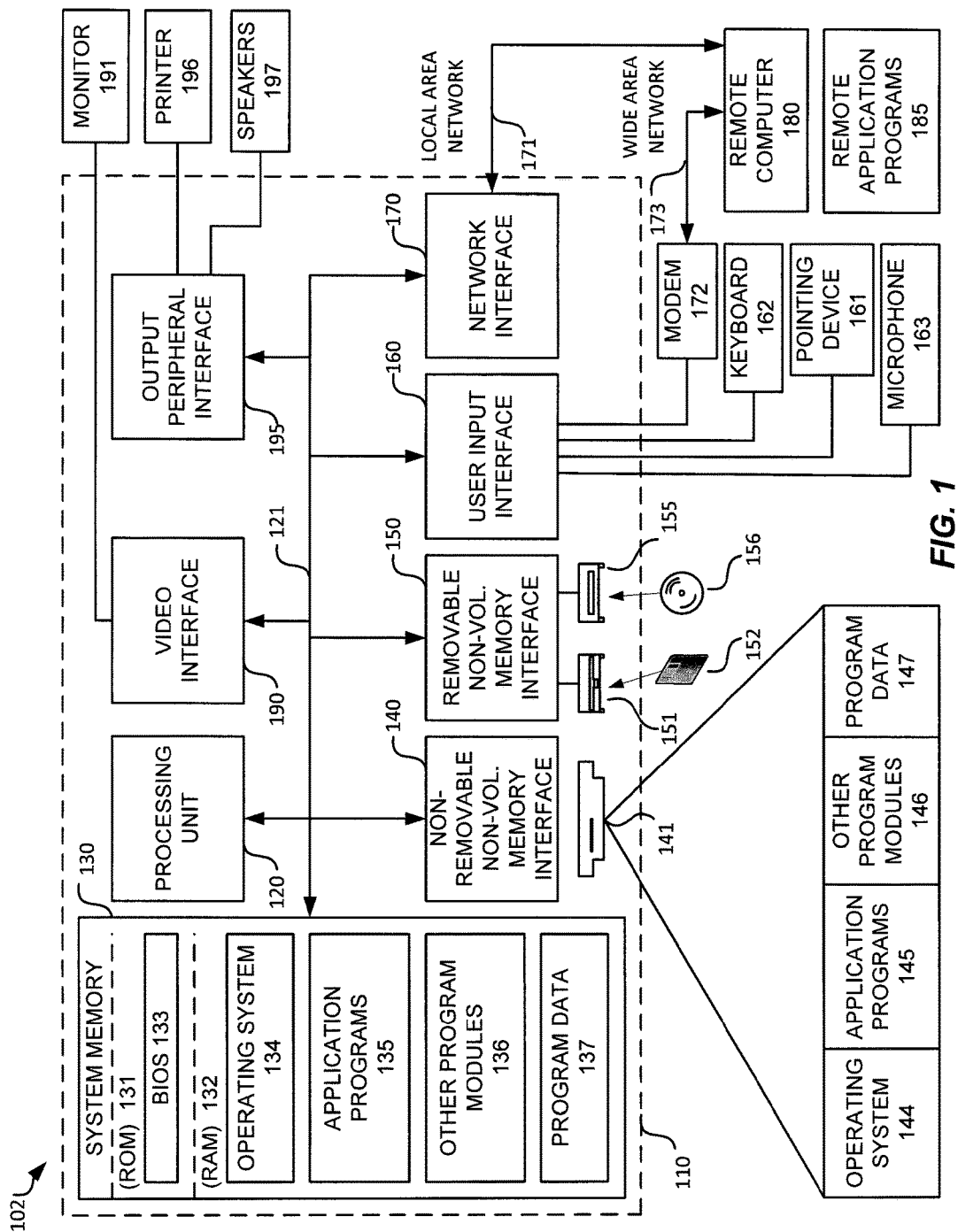
FIG. 1 shows a diagram of an example computing system that may be used with some embodiments.

Applications of systems and methods for identifying match candidates using match keys that are based on lookup fields will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In general, businesses use a CRM (Customer Relationship Management) system (also referred to as a database system or system) to manage business relationships and information associated with the business relationship. For example, this may include customer and prospect contact information, accounts, leads, and opportunities in one central location. The information may be stored in a database as objects. For example, the CRM system may include "account" object, "contact" object and "opportunities" object.

The "account" object may include information about an organization or person (such as customers, competitors, and partners) involved with a particular business. The "contact" object may include contact information, where each contact may be an individual associated with an "account". The "opportunities" object include information about a sale or a pending deal. Each object may be associated with fields. For example, the "accounts" object may include fields such as "company", "zip", "phone number", "website address", etc. The "contact" object may include fields such as "first name", "last name", "phone number", "accountID", etc. The "accountID" field of the "contact" object may be the ID of the account that is the parent of the contact. The "opportunity" object may include fields such as "amount", "accountID", etc. The "accountID" field of the "opportunity" object may be the ID of the account that is associated with the opportunity. Each field may be associated with a field value. For example, a field value for the "zip" field may be "94105".

There may be millions of records (e.g., individual contacts) in an object (e.g., contact object). When a new contact is inserted into the contact object, a matching rule (or match rule) may be applied to identify duplicate contacts. A matching rule may use criteria to determine how closely a field on a new or edited record matches the same field on an existing record, and, ultimately, whether the two records match. A match key may be used by a matching rule to quickly return a list of possible duplicates. The match key may be based on one or more fields. For example, a match key that is based on a "company" field and a "zip" field in an "accounts" object may be "company (2,6) zip (1,3)" with the numbers inside the brackets referring to number of tokens and number of characters per token.

Before the match keys are applied to any objects, the field values of those objects may be normalized. For example, if the object includes the field "company", then the normalization for the field "company" may include expanding the acronyms, having the first letter of each word be in lowercases, removing the suffices such as "Corporation", "Incorporated", "Inc", "Limited", "Ltd.", etc., and removing the stop words such as "and", "the", "of". Using this normalization example, the field value "Intel Corp." is normalized to become "intel", and the field value "IBM" is normalized to become "international business machine".

After the field values are normalized, some standard or pre-defined match keys are automatically applied when the matching rule is activated. An example of a pre-defined match key is "company (2, 6) zip (1, 3)" that is applied to the "account" object. For example, if the company name is "salesforce.com", then applying the first portion "company (2, 6)" of the match key results in the string "salesf", and if the company zip code is "94105-5188", then applying the second portion "zip (1, 3)" of the match key results in the string "941". The resulting key is therefore "salesf941". The process of applying the standard match keys may be referred to as indexing.

When the matching rule is activated, the match key is automatically applied to all existing records so that when the matching rule runs, the database system can look for candidate duplicates among records with the same key. For example, when the above example match key is applied to the "company" and "zip" fields, the key "sales941" is generated to match duplicate records having the same value in the "company" and "zip" fields. Using the match key to identify candidate duplicates can prevent users from saving duplicate records based on the value of one or more fields.

When there is an update to a field value of a field of an object, millions of updates may need to be performed before a match key associated with the field can be applied. For example, there may be a "company" field in the contact object, and when the field value for the "company" field is changed from one value (e.g., salesforce.com) to another value (e.g., salesforce), all the occurrences of "salesforce.com" in the contact object have to be changed to "salesforce" before a match key that is associated with the "company" field can be applied. When there are millions of contacts that need to be updated to reflect the new value "salesforce", the update may significantly affect the performance of the CRM system.

The disclosed embodiments may include systems and methods for matching objects and may include storing a first index as an alternative field value of a first field in a first record of an object, wherein the first index is related to a second index associated with a second field configured to store an actual field value of first field in the first record. The method also includes storing the first index as an alternative field value of a first field in a second record of the object, wherein the first index is related to a second index associated with a second field configured to store an actual field value of first field in the second record. The method further includes receiving a request to update the field value of the first field, and updating the field value of the first field in the first record and in the second record by updating the field value of the second field.

The disclosed embodiments may include methods for identifying match candidates and may include generating a match key associated with a lookup field of a database object. The method may also include activating a matching rule associated with the match key, and receiving a request to search for duplicate candidates in the database object. The request includes an input entity that is used to identify match candidates in a database object. The duplicate candidates in the database object may be identified by using the input entity and the matching rule.

The disclosed embodiments may include an apparatus for identifying match candidates using lookup keys and include a processor, and one or more stored sequences of instructions which, when executed by the processor, cause the processor to generate a match key associated with a lookup field of a database object. The apparatus may cause activating a matching rule associated with the match key, and receiving a request to search for duplicate candidates in the database object. The request includes an input entity that is used to identify match candidates in a database object. The duplicate candidates in the database object may be identified by using the input entity and the matching rule.

The disclosed embodiments may include a machine-readable medium carrying one or more sequences of instructions for identifying match candidates using a lookup key, which instructions, when executed by one or more processors, may cause the one or more processors to generate a match key associated with a lookup field of a database object. The machine readable medium may include instructions that cause activating a matching rule associated with the match key, and receiving a request to search for duplicate candidates in the database object. The request includes an input entity that is used to identify match candidates in a database object. The duplicate candidates in the database object may be identified by using the input entity and the matching rule.

For some embodiments, a matching rule key is generated based on a matching rule, wherein the matching rule specifies whether two objects match. Candidate keys are created by applying the matching rule key to data objects. A probe key is created by applying the matching rule key to a probe object. A determination is made whether the probe key matches a candidate key. A determination is made whether the probe object matches a candidate object based on applying the matching rule to the probe object and the candidate object if the probe key matches the candidate key corresponding to the candidate object. The probe object and the candidate object are identified as matching based on the matching rule if the probe object matches the candidate object.

For example, a system converts the matching rule Boolean formula for the matching rule F1F2+F3F4 into the disjunctive normal form {F1F2, F3F4}, and then defines the keys to be the terms F1F2 and F3F4 of the disjunctive normal form matching rule. The system applies the matching rule keys of F1F2 and F3F4 to a database object with the F1 value=a, the F2 value=b, the F3 value=c, and the F4 value=d, to create the candidate key "ab" for F1F2 and the candidate key "cd" for F3F4. The system applies the matching rule keys for F1F2 and F3F4 to a probe object with the F1 value=e, the F2 value=f, the F3 value=g, and the F4 value=h, to create the probe key "ef" for F1F2 and the probe key "gh" for F3F4. The system finds all of the candidate objects which have candidate keys with the value "ef" for F1F2 or the value "gh" for F3F4. The system applies the matching rule to the probe object with the values "efgh" and a candidate object with candidate keys that match the probe keys to determine whether the probe object matches the candidate object. The system identifies the probe object with the values "efgh" as a duplicate of an object already stored in the database.

While one or more implementations and techniques are described with reference to an embodiment in which matching object using keys based on matching rules is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computing system that may be used with some embodiments of the present invention. The computing system 102 may be used by a user to view information associated with a multi-tenant database environment. For example, the multi-tenant database environment may be associated with the services provided by salesforce.com®.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
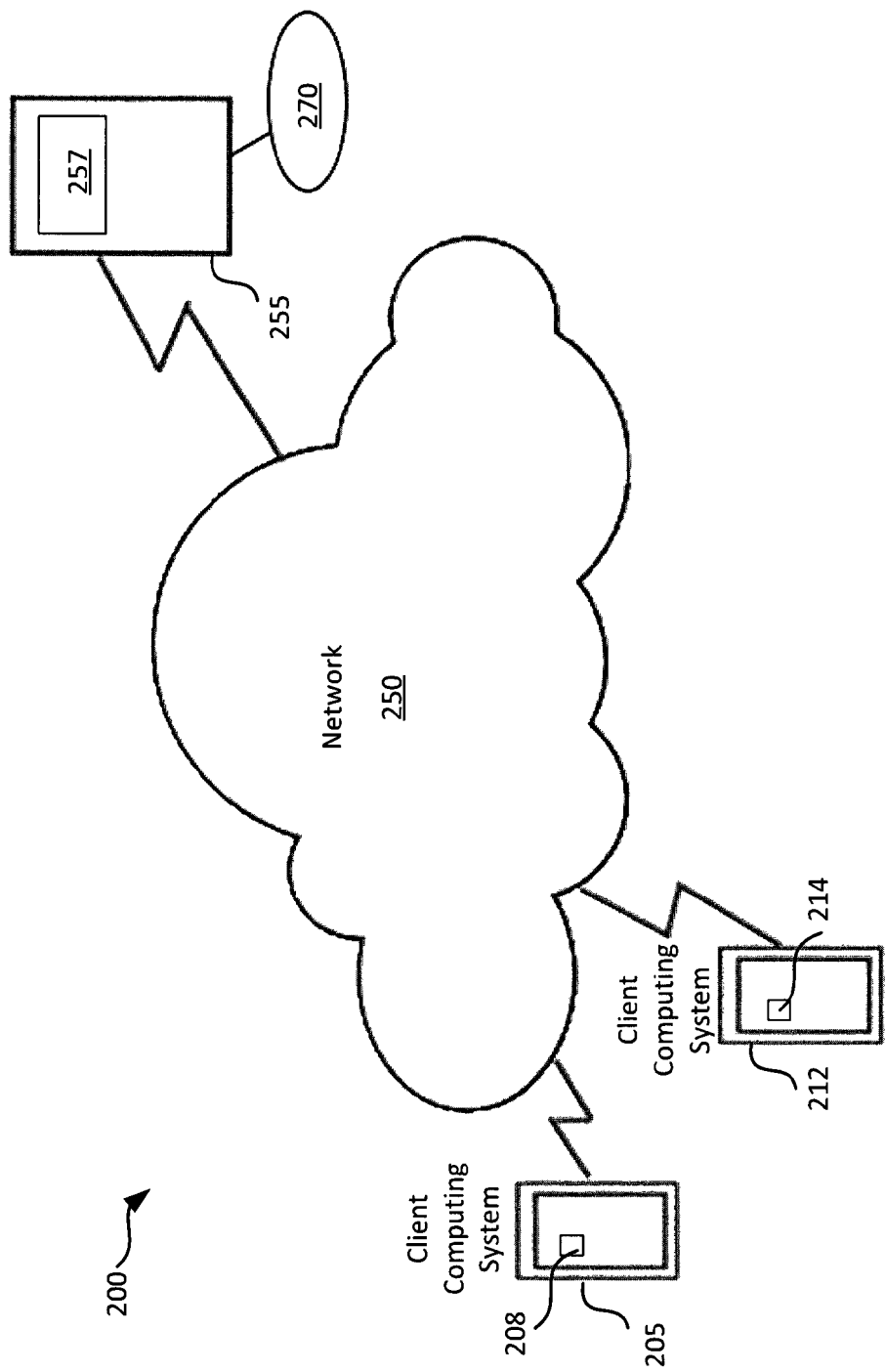
FIG. 2 shows a diagram of an example network environment that may be used with some embodiments.

FIG. 2 shows a diagram of an example network environment that may be used with some embodiments of the present invention. Network environment 400 includes computing systems 205 and 212. One or more of the computing systems 205 and 212 may be a mobile computing system. The computing systems 205 and 212 may be connected to the network 250 via a cellular connection or via a Wi-Fi router (not shown). The network 250 may be the Internet. The computing systems 205 and 212 may be coupled with server computing system 255 via the network 250.

The computing systems 205 may include application module 208. A user may use the computing system 205 and the application module 208 to connect to and communicate with the server computing system 255 and log into application 257 (e.g., a Salesforce.com® application). The server computing system 255 may be coupled with database 270. The server computing system 255 may be associated with an entity (e.g., Salesforce.com®).

Figure 3:
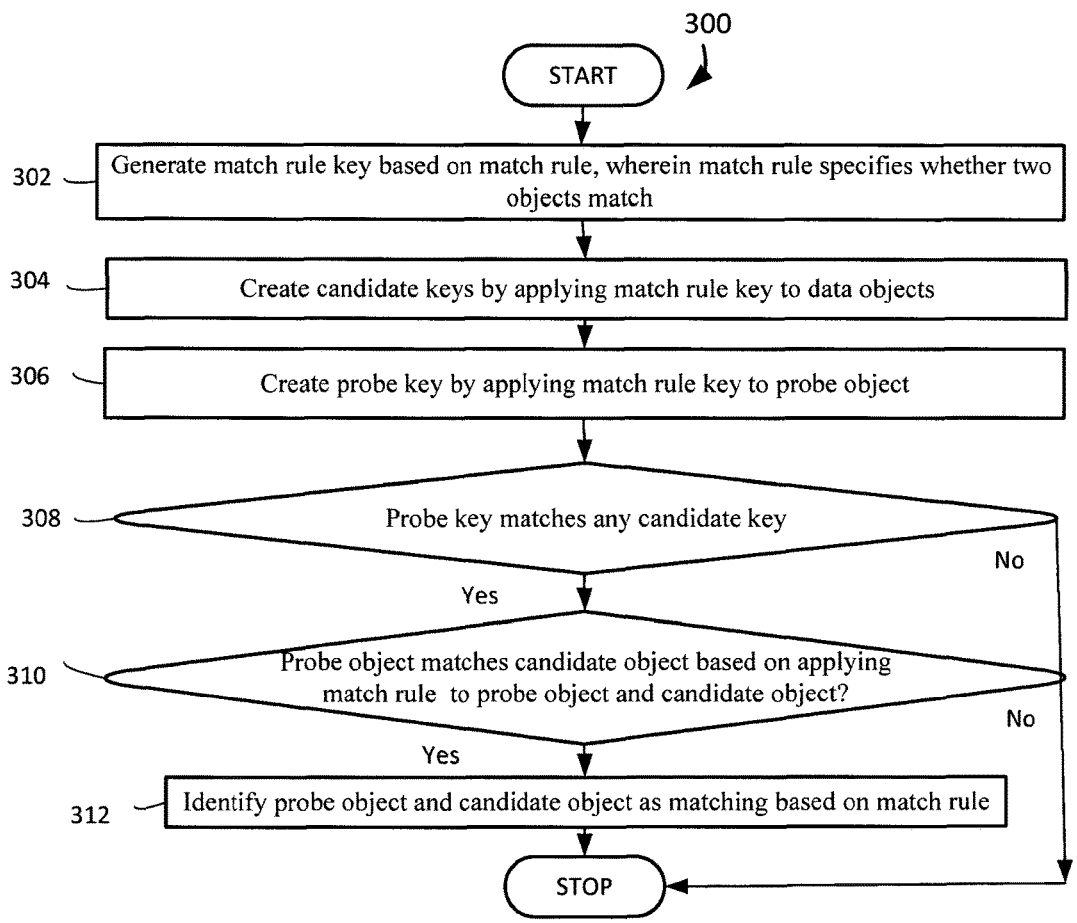
FIG. 3 shows an operational flow diagram illustrating a high level overview of a method for matching objects using keys based on matching rules, in accordance with some embodiments.

FIG. 3 is an operational flow diagram illustrating a high level overview of a method 300 for matching objects using keys based on matching rules. As shown in FIG. 3, a database system matches objects using keys based on matching rules. A database system generates a matching rule key based on a matching rule, wherein the matching rule specifies whether two objects match, block 302. For example and without limitation, this can include the database system converting the matching rule Boolean formula for the matching rule F1F2+F3F4 into the disjunctive normal form {F1F2, F3F4}, and then defining the keys to be the terms F1F2 and F3F4 of the disjunctive normal form matching rule. In another example, the database system converts the matching rule Boolean formula for matching rule F1+F2+F3+F4 into the disjunctive normal form {F1, F2, F3, F4}, and then defines the keys to be the terms F1, F2, F3, and F4 of the disjunctive normal form matching rule. In yet another example, the database system converts the matching rule Boolean formula for matching rule (F1+F2)(F3+F4) into the disjunctive normal form {F1F3, F2F3, F1F4, F2F4}, and then defines the keys to be the terms F1F3, F2F3, F1F4, and F2F4 of the disjunctive normal form matching rule. The first two matching rules examples were already in disjunctive normal form, such that only the third matching rule example needed to be converted. The database system generates keys based on a matching rule, such that the narrower that a matching rule is, the smaller the candidate list will be.

Having generated a matching rule key, the database system creates candidate keys by applying the matching rule key to data objects, block 304. By way of example and without limitation, this can include the database system applying the matching rule keys of F1F2 and F3F4 to a database object with the F1 value=a, the F2 value=b, the F3 value=c, and the F4 value=d, to create the candidate key ab for F1F2 and the candidate key cd for F3F4. The database system creates candidate keys by applying the matching rule key to a data object only when the data object is first added to the database or when the data object is updated in the database.

The value of a key of the form FiFj for an object r is "ci(ri)·cj(rj)", where "ri" is the value of field Fi in r, "ci" the aforementioned coarsening function for field Fi, and "·" is the concatenation operator. When using identity coarsening functions, two objects with the same value on any key match, which is the property that enables the algorithm to produce small size candidate lists on narrow matching rules.

Values of some fields of an object may be missing, such as null values. One way for the database system to cope with missing values is to treat a null value as a particular value, which is referred to as a default match option. However, treating a null value as a particular value may produce undesirable results in certain situations. For example, business contact objects may have many fields, including a field for an email address, and a matching rule that uses this email field may specify that two objects match if the two objects have the same value in their email fields. If the database system treats a null value as a particular value, any two business contact objects which are missing email values would be considered as matching because their null values, treated as a particular value, would match, thereby producing undesirable results. Therefore, the database system may treat missing values in an alternative manner, and interpret the email field in the disjunctive normal form version of a matching rule as "both objects must have non-empty email address values, and the non-empty email address values must match," which is referred to as a required match option.

The database system may treat null values in yet another manner. For example, the database system may apply a matching rule including a term for a first name field, a last name field, a company name field, and a country name field to two business contact objects for which the first name fields match, the last name fields match, and the company name fields match. A system administrator may want this pair of business contact objects to be deemed a match unless both business contact objects have non-empty country name fields and the non-empty country name fields do not match. Therefore, the database system treats the business contact objects as matching when the country name field is missing a value in one of the objects or in both of the objects, and treats the business contact objects as not matching only when there is clear evidence that both countries field include non-empty values and the non-empty values are not matching, which is referred to as a null match option.

The matching rule notation is generalized to accommodate such distinctions. In each term of matching rules in disjunctive normal form, each of the fields will have one of three match options, the default match option, the required match option, or the null match option. In the following examples of match options, x denotes a non-null value, and x' denotes a non-null value, possibly different than x, which should match x. The default match option matches the pair (null, null) and matches the pair (x, x'). The required match option matches the pair (x, x'). The null match option matches the pair (null, x), matches the pair (x, null), and matches the pair (x, x'). Using this terminology, the desired versions of the two terms discussed in the email and country examples become email(R) and firstname(R) lastname(R) companyname(R) countryname (N), respectively.

The database system begins with the disjunctive normal form matching rules and drops all fields labeled N (null match option) from each term for generating keys, but does not drop all fields labeled N from the actual matching rules. Each of the resulting terms becomes a key. In a key, the match option labels on its fields are preserved. A table of example keys based on matching rules is depicted in FIG. 4A and described below in the description of FIG. 4A. A table of examples of applying matching rule keys to objects is depicted in FIG. 4B and described below in the description of FIG. 4B.

The database system matches a pair of objects using a matching rule significantly faster than an algorithm which tests each term in a disjunctive normal form matching rule, one by one. The database system builds a custom inverted index from a match option labeled field to all the terms in the disjunctive normal form matching rule whose first match option labeled field is the match option labeled field. This processing assumes that the fields in any term in the disjunctive normal form matching rule are ordered in increasing order, an assumption which is easily met. The database system builds this index when the matching rule is created. The database system efficiently builds this index in one pass over all the terms in the disjunctive normal form matching rule. Below is an example of a matching rule based on match options and a corresponding inverted index with match option labels.

Matching rule: (F1(R) and F2(N)) OR (F1(R) and F3(R)) OR (F3(D) and F4(R))
Inverted index:
F1(R)→F1(R) and F2(N), F1(R) and F3(R)
F3(D)→F3(D) and F4(R) \

After applying the match key rule to the data objects to create candidate keys, the database system creates a probe key by applying the matching rule key to a probe object, block 306. In embodiments, this can include the database system applying the matching rule keys of F1F2 and F3F4 to a probe object with the F1 value=e, the F2 value=f, the F3 value=g, and the F4 value=h, to create the probe key ef for F1F2 and the probe key gh for F3F4.

After applying the matching rule to objects to create keys, the database system determines whether the probe key matches any candidate key, block 308. For example and without limitation, this can include the database system finding all of the candidate objects which have candidate keys with the value "ef" for F1F2 or the value "gh" for F3F4. If the database system determines that the probe key matches any candidate key, the method 300 continues to block 310. If the database system determines that the probe key does not match any candidate key, the method terminates.

Having determined that the probe key matches a candidate key corresponding to a candidate object, the database system determines whether the probe object matches the candidate object based on applying the matching rule to the probe object and the candidate object, block 310. By way of example and without limitation, this can include the database system applying the matching rule to the probe object with the values "efgh" and a candidate object with candidate keys that match the probe keys to determine whether the probe object matches the candidate object. If the database system determines that the probe object matches the candidate object, the method 300 continues to block 312. If the database system determines that the probe object does not match any of the candidate objects, the method terminates.

Two objects, X and Y, with n fields, may be matched as follows.
for i←1 to n
Mi←match-type(Xi, Y i)
if there is a key in the inverted index for Mi
evaluate the indexed terms one by one and return true after the first one that is true
end if
end
return false Here "Mi" is match type 0 if (Xi, Yi) is of the form (x, y), "Mi" is match type 1 if (Xi, Yi) is of the form (null, null), "Mi" is match type 2 if (Xi, Y i) is of the form (x, x), and "Mi" is match type 3 if (Xi, Y i) is of the form (null, x) or (x, null). "Mi" is used in "if there is a key in the inverted index for Mi." An example table of objects to be tested for matching, and their corresponding match type values, are depicted in FIG. 4C and described below in the description of FIG. 4C.

Having determined that the probe object matches the candidate object, the database system identifies the probe object and the candidate object as matching based on the matching rule, block 312. In embodiments, this can include the database system identifying the probe key with the values "efgh" as a duplicate of an object already stored in the database.

The method 300 may be repeated as desired. Although this disclosure describes the blocks 302-312 executing in a particular order, the blocks 302-312 may be executed in a different order. In other implementations, each of the blocks 302-312 may also be executed in combination with other blocks and/or some blocks may be divided into a different set of blocks.

FIGS. 4A, 4B and 4C illustrate example tables 400-404 for matching objects using keys based on matching rules, in accordance with some embodiments. A table 400 of example keys based on matching rules is depicted in FIG. 4A. The database system begins with the disjunctive normal form matching rules, which are depicted in the left column in table 400, and drops all fields labeled N (null match option) from each term for generating keys, which are depicted in the left column in table 400, but does not drop all fields labeled N from the actual matching rules. Each of the remaining terms become a key. In a key, the match option labels on its fields are preserved. For example, the database system drops the field labeled F2(N) from the term F1(R) F2(N) in the matching rule depicted in the first data row of the table 400 to create the key F1(R) in the first row if the table 400.

A table 402 of examples of applying matching rule keys to objects is depicted in FIG. 4B. This depiction is for the matching rule which has its keys depicted in the first data row of the table 400. In the table 402, a blank cell denotes a null key value, which are neither indexed, nor looked up. For example, since the value for F1 is null in the second data row of the table 402, and the F1(R) key requires a data value, the F1(R) value is depicted as a blank cell in the second row of the table 402.

An example table 404 of objects to be tested for matching, and their corresponding match type values, are depicted in FIG. 4C. The matching rule applied to the data objects X and Y is the matching rule depicted in the previous example:
Matching Rule: (F1(R) and F2(N)) OR (F1(R) and F3(R)) OR (F3(D) and F4(R))
The database system generates the inverted index from this matching rule:
F1(R)→F1(R) and F2(N), F1(R) and F3(R)
F3(D)→F3(D) and F4(R)

As depicted in the table 404, the X and Y values for F1 correspond to match type 3, which is the null match option. However, the inverted index includes only the required match option for F1 for pointers that begin with F1, such that F1 cannot match the objects X and Y. As depicted in the table 404, the X and Y values for F2 correspond to match type 0, which is the no match designation. Even if the X and Y values for F2 corresponded to any of the match options, the inverted index does not include any match options, or any terms, for pointers that begin with F2, such that F2 cannot match the objects X and Y.

As further depicted in the table 404, the X and Y values for F3 correspond to match type 1, which is the default match option. The inverted index includes the default match option for pointers that begin with F3, such that F3 can match the objects X and Y, provided that the rest of the term pointed to by the pointer F3(D) in the inverted index is satisfied. The rest of the term pointed to by the pointer F3(D) in the inverted index is F4(R). As depicted in the table 404, the X and Y values for F4 correspond to match type 2, which is the required match option. The inverted index includes the required match option for F4 for pointers that begin with F3, such that F4 can match the objects X and Y, provided that the rest of the term in the inverted index pointed to by F3 is satisfied. Since both values for the term F3(D) and F4(R) pointed to by F3 are satisfied, the database system identifies the objects X and Y as matching based on the corresponding matching rule.

FIGS. 4D, 4E and 4F illustrate example tables 420-430 for matching objects using lookup fields, in accordance with some embodiments. Table 420 may be associated with a contact object which may include a "first name" field, a "last name" field and an "account name" field 422. Each of the record in the table 420 is associated with an index 421. In the current example, table 420 is shown with three records, each associated with an account name. For example, the first and second records in the table 420 is associated with the account name "salesforce.com" while the third record is associated with the account name "microsoft". There may be millions of records in table 420 associated with the same account name (e.g., "salesforce.com"). If the account name "salesfore.com" is to be changed to "salesforce", all of the records having the account name "salesforce.com" would have to be updated which may not be efficient.

Table 425 shows one embodiment of an implementation of table 420 where a lookup field 426 is used to look up the actual account name. Since the first and second records in table 420 are associated with the same account name "salesforce.com", the same lookup value "00FA" is shown in the first and second records in table 425. Table 430 includes lookup field 426 that are similar to the lookup field shown in table 425. Under the lookup field 426 are different lookup values "00FA" and "00DE". Each lookup value corresponds to a unique lookup key. For example, the lookup value "00FA" corresponds to the lookup key "salesforce.com", and the lookup value "00DE" corresponds to the lookup key "microsoft".

The lookup value "00FA" in table 430 corresponds to the lookup values of both the first and second records of the table 425. The lookup value "00FA" shown in the table 425 is associated with a lookup field 426. For example, the lookup field may be "account name". The lookup value "00FA" may be referred to as a lookup identifier or lookup id. In this example, the first name field 423 and the last name field 424 are not implemented as lookup fields. These fields may be referred to as non-lookup fields. For some embodiments, there may be at least one lookup field.

The first record of the table 430 is shown being associated with the account name "salesforce.com" which corresponds to the account names in both the first and second records of the table 420. Using the updating approach described with the example tables 425 and 430, it may be more efficient to update the account name from "salesforce.com" to "salesforce" in the table 430 because this update only affects one record in the table 430, rather than millions of records in table 420.

The updating method described above may affect how a matching rule is applied to identify duplicate candidates in a database object, especially when the matching rule is based on a match key associated with a lookup field. For example, assume that the record to match is the first record (with contact "Parth Vaishnav" at Salesforce.com) in a contact object associated with the table 420, and assume that the match key involves the fields be "first name", "last name" and "account name" such as shown in table 425, then the database system may need to be able to identify that the "account name" field 426 is a lookup field. The "account name" field 426 that corresponds to the name "Parth Vaishnay" has a lookup value "00FA". Using the lookup value "00FA", the system can identify that the look key is "salesforce.com", as shown in table 430. In this example, if the match key only includes the "first name" and "last name" fields, then the match key may be referred to as a full key. If the match key includes the "first name" and "account name" fields, then the match key may be referred to as a partial key because the "account name" field is a lookup field, and the database system has to find the lookup key (e.g., salesforce.com) corresponding to the particular lookup value (e.g., "00FA").

FIG. 5A shows an example of a matching rule, in accordance with some embodiments. Normally, a matching rule points to a single match index definition 510. The matching rule 505 is defined to include a prefix 508 as "0JD" (shown used with item 609 in FIG. 6A as "0JDx1").

FIG. 5B shows an example matching rule item, in accordance with some embodiments. In this example, the matching rule item 525 includes information about a matching rule and information about the fields associated with the matching rule item and the matching rule. The matching rule item 525 also includes information about the behavior of the matching rule when any of the field has a blank value. The matching rule item 525 also includes lookup information 530 to indicate operations that may need to be performed for a particular lookup field.

FIG. 5C shows an example of a match index, in accordance with some embodiments. In this example, the match index 545 may include information about the matching rule and the match index definition 550. The match index 545 may also include information about the deployment state.

FIG. 6A shows another example matching rule, in accordance with some embodiments. Table 605 shows a matching rule having the ID 608 as "0JDx1". In this example, the matching rule "0JDx1" uses the Boolean filter "1 and 2 and 3" to reflect that the matching rule uses all three fields based on the "AND" Boolean logic. The matching rule is associated with a primary index 610 as "0JKx1" (also shown in group 664 of FIG. 6D) and with a lookup index 612 as "0JKx2" (also shown in group 663 of FIG. 6D). The matching type 614 is to be exact matching, and the current status 616 of the matching rule is "undeployed".

For some embodiments, when a matching rule is activated, a background process may be performed to scan through all entities of the primary index and all the entities of the lookup index and indexes them using a disjunctive normal form. For example, the background process may be a synchronous process and may set the primary index as a reference to an identifier of the lookup index to which it is associated with, and the lookup index associates its identifier to the name of the lookup entity (e.g., the account name "salesforce.com"). For some embodiments, the primary index and the lookup index may be created simultaneously.

When a matching rule with a lookup field is activated, the system may deploy a primary index 610 and a lookup index 612. The primary index 610 is configured to be associated with fields included in a match key without a lookup field. The lookup index 612 is configured to be associated with a field included in the match key with a lookup field.

FIG. 6B shows an example matching rule item, in accordance with some embodiments. The dotted line between the table 605 of FIG. 6A and the table 620 of FIG. 6B shows the relationship between the two tables based on the ID of the matching rule. Table 620 shows the matching rule item that is associated with the matching rule "0JDx1" (shown in table 605). In this example, the matching rule "0JDx1" is associated with three fields "first name", "last name", and "accountID", having the respective order 635 of "1", "2" and "3". The third field "accountID" is shown to be associated with a lookup entity 630 as "account", indicating that a lookup needs to be performed to find the value for "account" to perform the matching. The matching rule "0JDx1" is to consider any blank value as null when matching, as shown in the blank value behavior column 638.

FIG. 6C shows an example match index definition, in accordance with some embodiments. In this example, table 640 includes a list of match index definition, each associated with an ID 642. For example, there are two match index definition having the IDs "0JKx1" and "0JKx2". Each of the match index definition "0JKx1" and "0JKx2" is associated with the matching rule "0JDx1" shown under the value generator 644 and a deployment state 646 (e.g., "undeployed").

FIG. 6D shows an example match index values, in accordance with some embodiments. In this example, table 660 includes a list of the match index definition IDs 662. The dotted lines between the table 660 of FIG. 6D and the table 640 of FIG. 6C show the relationship between the two tables based on the IDs of the different match index definition. The table 660 also includes the entity ID column 665 that shows entity IDs "001xA" "001xB" "001xC" and "001xD" being associated with the lookup index "0JKx2", and the other entity IDs being associated with the primary index "0JKx1". The table 660 also includes the name column 667 that includes different name identifier (e.g., "2", "012"), and the value column 670 that includes the different account name values (e.g., "salesforce.com", "microsoft"). Group 663 includes the IDs "0JKx2" which correspond to the lookup index id 612 (shown in FIG. 6A), while group 664 includes the IDs "0JKx1" which correspond to the index ID 610 (shown in FIG. 6A).

For example, a lookup index value may be "0JKx2" (shown in table 605 of FIG. 6A) is also shown in the match index definition table 640 of FIG. 6C and in the match index value table 660 of FIG. 6D. It may be noted that the table 660 shows the lookup index value "00Kx2" to be associated with multiple entity identifiers (e.g., "001xA", "001xB", "001xC", and "001xD"). For some embodiments, the indexing process is to index all the lookup entities. For example, the indexing process may index all of the records in the "account" object, including the records that do not include a "contact".

After the matching rule is activated, the system may find the identifier (e.g., "001xA") of the lookup entity via a name associated with an input entity such as a new record (e.g., new contact) to be added to an object (e.g., contact object). Then the system may find the match candidates using the ids plus the value generated by the value generator 644 (shown in FIG. 6C). For example, referring to FIG. 6D, if the system is trying to match an input contact with first name "Parth", last name "Vaishnav", and account name "Salesforce.com" with existing contacts in the contact database object, the system may perform the following operations:

Phase 1: Perform a query using the lookup index "0JKx2" (shown in table 605 of FIG. 6A), name="2" and the account value of "salesforce.com" from the match input contact. The query results in the IDs "001xA" and "001xB" (shown in records 672 and 674 of FIG. 6D).

Phase 2: Use the IDs "001xA" and "001xB" found in phase 1, and the first and last name "Parth Vaishnav" from the match input contact to form the values "parth;vaishnav;001xA" and "parth;vaishnav;001xB". Then using these values "parth;vaishnav;001xA" and "parth;vaishnav;001xB" to perform a query of the primary index "0JKx1" and find the entity ID "003xX" (shown in highlighted record 676 of FIG. 6D) based on a match with the value "parth;vaishnav;001xA". Using the entityID "003xX", the individual duplicate candidates can be evaluated.

Figure 7A:
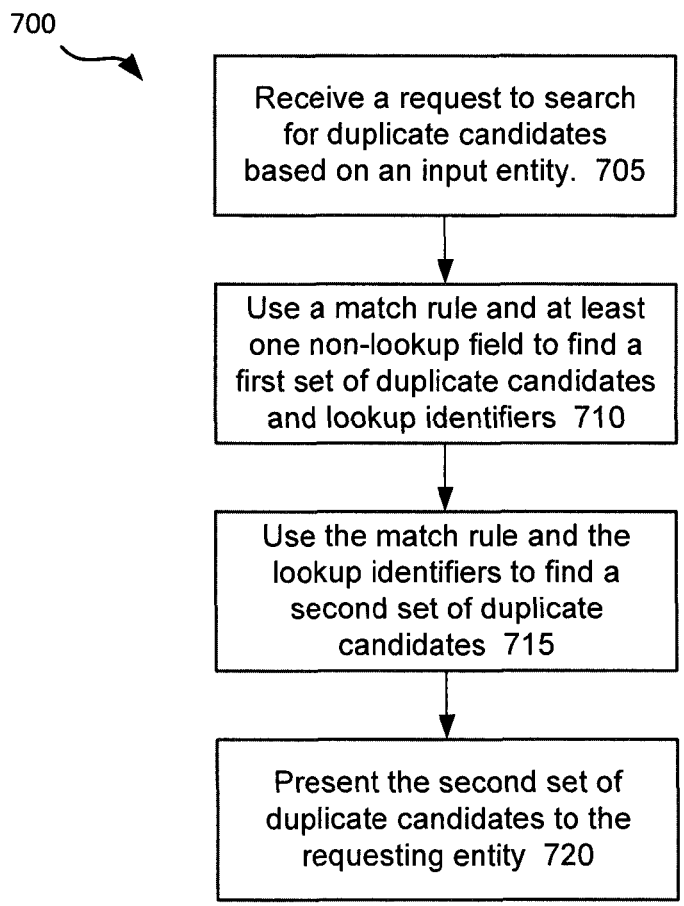
FIGS. 7A and 7B show flowcharts of an example process for matching candidates using lookup fields, in accordance with some embodiments.

FIG. 7A shows a flowchart of an example process for matching candidates using lookup fields, in accordance with some embodiments. The example process 700 may start at block 705, where a request is received to search for duplicate candidates in an object (e.g., contact object) associated with a database. The request may be based on an input entity (e.g., a new contact to be inserted to the contact object). At block 710, the process uses a matching rule that is associated with at least one non-lookup field (e.g., first name field) to find a first set of duplicate candidates and their lookup values. The lookup values may be associated with a lookup field (e.g., account name field). The at least one non-lookup field (e.g., first name field) may be associated with a first value (e.g., first name) of the input entity. At block 715, the process may use a second value (e.g., account name) of the input entity and the lookup values to find a second set of duplicate candidates. The second set of duplicate candidates may be a subset of the first set of duplicate candidates. At block 720, the duplicate candidates in the second set of duplicate candidates may be presented to the requesting entity (e.g., a user via a user interface or an application program).

Figure 7B:
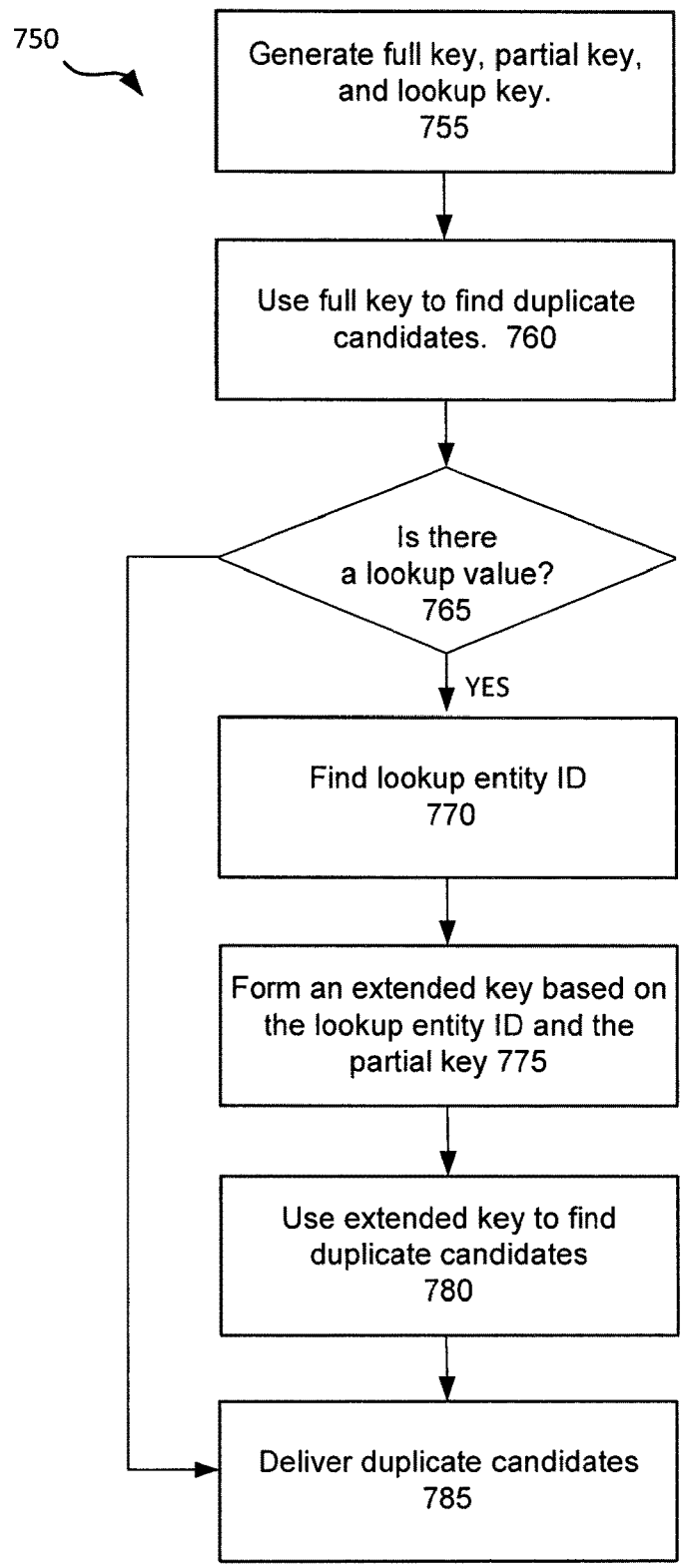

FIG. 7B shows a flowchart of another example process for matching candidates using lookup fields, in accordance with some embodiments. The example process 750 may be associated with a matching rule and may start at block 755 where several keys may be generated to perform the matching operations. The keys may include a key that is not associated with a lookup value (referred to as full key). The keys may include a key that needs a lookup value (referred to as partial key). The keys may include a key that is generated from a lookup entity name (referred to as lookup key). For example, the lookup key may be "salesforce.com". The partial key may only exist if the lookup field is used in the matching rule. The keys are then used to query for duplicate candidates.

At block 760, the full key is used to find the duplicate candidates in an object associated with a database. At block 765, the process determines if a partial key is involved in the matching rule. If there is no partial key, then there is no need to generate an extended key and the duplicate candidates found using the full key may be sufficient, and the process may flow to block 785. From block 765, if there is a partial key, the process continues to block 770 where it searches for the lookup key using the partial key. At block 775, an extended key is generated based on the lookup key and the partial key. At block 780, the extended key is used to find the duplicate candidates. At block 785, the duplicate candidates is presented to the user or application that inquires about the duplicate candidates (e.g., a user via a user interface or database application program). The process 750 may be performed for each input entity (e.g., a new contact to be inserted into a contact object).

Figure 8A:
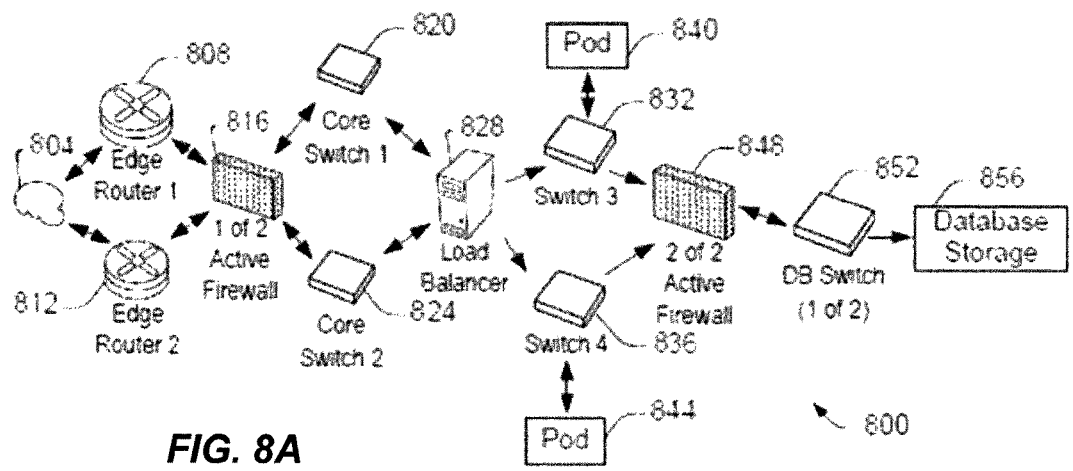
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
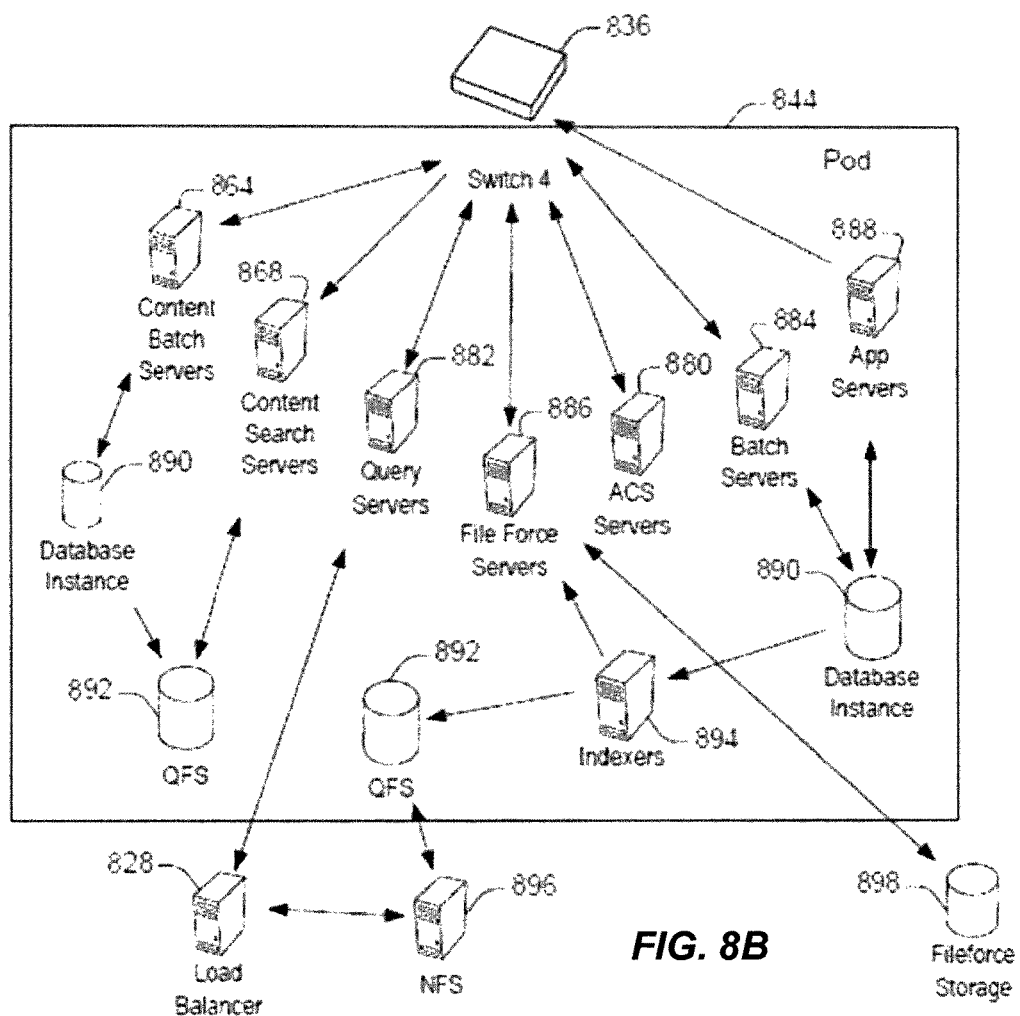
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
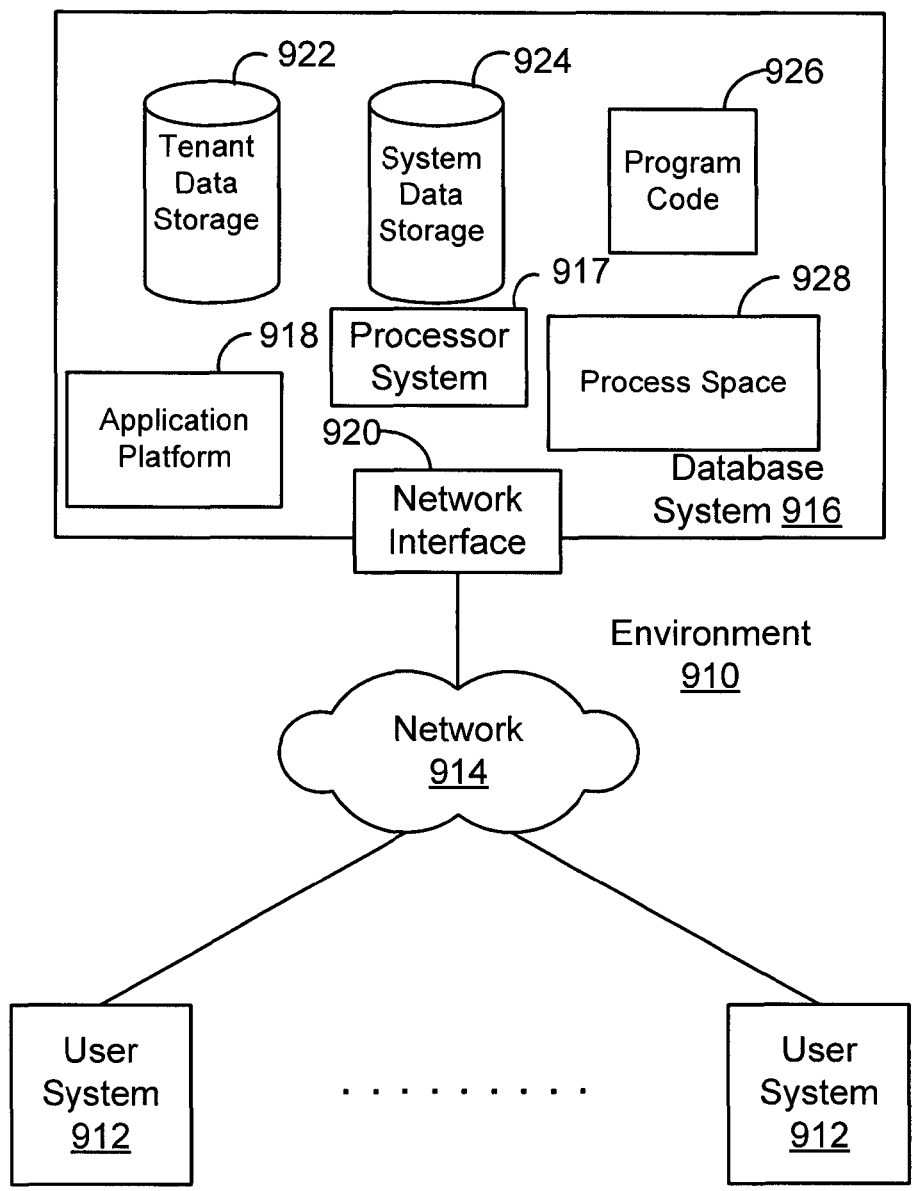
FIG. 9 shows a system diagram illustrating the architecture of a multitenant database environment, in accordance with some embodiments.
Figure 10:
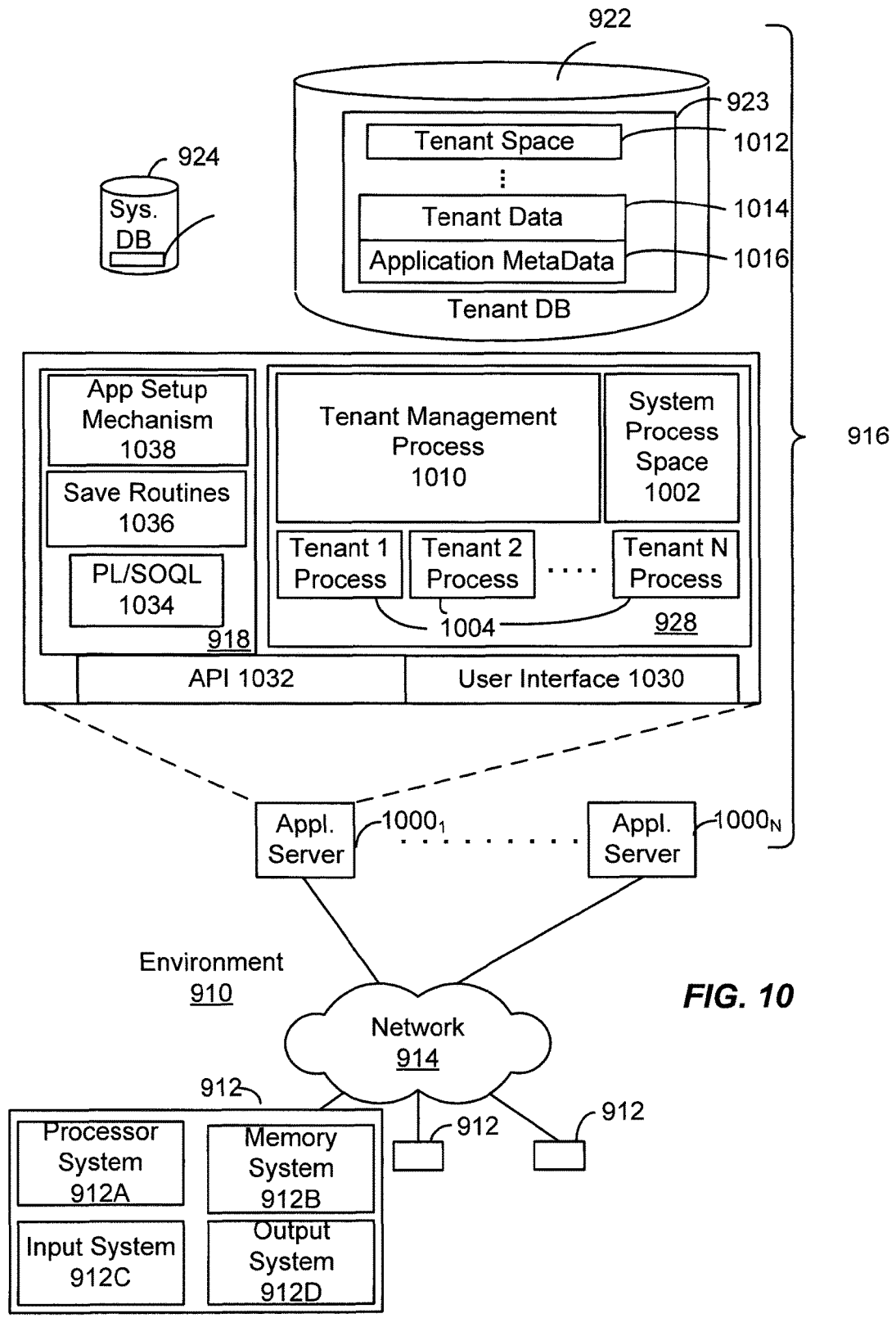
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used.

For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method comprising:
generating, by a database system, a match key associated with a lookup field of a database object and associated with another field of the database object;
activating, by the database system, a matching rule associated with the match key;
receiving, by the database system, a request to search for candidates in the database object that are duplicates, the request including a probe entity; and
identifying, by the database system, the duplicate candidates in the database object by:
creating a plurality of candidate keys by applying the match key to a corresponding plurality of candidates in the database object, and creating a probe key by applying the match key to the probe entity,
determining whether the probe key matches any of the plurality of candidate keys, and
determining, when the probe key matches any of the plurality of candidate keys, whether the probe entity matches any of the plurality of candidates corresponding to the matched candidate keys by applying the matching rule to the probe entity and to the candidates corresponding to the matched candidate keys.

2. The method of claim 1, wherein the duplicate candidates in the database object are identified based on a lookup value associated with each of the duplicate candidates.

3. The method of claim 2, wherein the duplicate candidates in the database object are identified based on a lookup key associated with each lookup value.

4. The method of claim 3, wherein the duplicate candidates in the database object are identified based on a lookup key of each of the duplicate candidates and based on a field value of the probe entity.

5. The method of claim 4, wherein the field value of the probe entity corresponds to the lookup field.

6. The method of claim 5, wherein the other field of the database object comprises a non-lookup field of the database object.

7. The method of claim 6, wherein the duplicate candidates in the database object are identified based the lookup field and the non-lookup field.

8. An apparatus for identifying duplicate candidates in a database object, the apparatus comprising:
a processor; and
one or more stored sequences of instructions which, when executed by the processor, cause the processor to:
generate a match key associated with a lookup field of a database object and associated with another field of the database object;
activate a matching rule associated with the match key;
receive a request to search for candidates in the database object that are duplicates, the request including a probe entity; and
identify the duplicate candidates in the database object by:
creating a plurality of candidate keys by applying the match key to a corresponding plurality of candidates in the database object, and creating a probe key by applying the match key to the probe entity,
determining whether the probe key matches any of the plurality of candidate keys, and
determining, when the probe key matches any of the plurality of candidate keys, whether the probe entity matches any of the plurality of candidates corresponding to the matched candidate keys by applying the matching rule to the probe entity and to the candidates corresponding to the matched candidate keys.

9. The apparatus of claim 8, wherein the duplicate candidates in the database object are identified based on a lookup value associated with each of the duplicate candidates.

10. The apparatus of claim 9, wherein the duplicate candidates in the database object are identified based on a lookup key associated with each lookup value.

11. The apparatus of claim 10, wherein the duplicate candidates in the database object are identified based on a lookup key of each of the duplicate candidates and based on a field value of the probe entity.

12. The apparatus of claim 11, wherein the field value of the probe entity corresponds to the lookup field.

13. The apparatus of claim 12, wherein the other field of the database object comprises a non-lookup field of the database object.

14. The apparatus of claim 13, wherein the duplicate candidates in the database object are identified based the lookup field and the non-lookup field.

15. A non-transitory machine-readable medium carrying one or more sequences of instructions for identifying match candidates, which instructions, when executed by one or more processors, cause the one or more processors to:
generate a match key associated with a lookup field of a database object and associated with another field of the database object;
activate a matching rule associated with the match key;
receive a request to search for candidates that are duplicates in the database object, the request including a probe entity; and
identify the duplicate candidates in the database object by:
creating a plurality of candidate keys by applying the match key to a corresponding plurality of candidates in the database object, and creating a probe key by applying the match key to the probe entity,
determining whether the probe key matches any of the plurality of candidate keys, and
determining, when the probe key matches any of the plurality of candidate keys, whether the probe entity matches any of the plurality of candidates corresponding to the matched candidate keys by applying the matching rule to the probe entity and to the candidates corresponding to the matched candidate keys.

16. The non-transitory machine-readable medium of claim 15, wherein the duplicate candidates in the database object are identified based on a lookup value associated with each of the duplicate candidates.

17. The non-transitory machine-readable medium of claim 16, wherein the duplicate candidates in the database object are identified based on a lookup key associated with each lookup value.

18. The non-transitory machine-readable medium of claim 17, wherein the duplicate candidates in the database object are identified based on a lookup key of each of the duplicate candidates and based on a field value of the probe entity.

19. The non-transitory machine-readable medium of claim 18, wherein the field value of the probe entity corresponds to the lookup field.

20. The non-transitory machine-readable medium of claim 19, wherein the match key is further associated with a non-lookup field of the database object, and wherein the duplicate candidates in the database object are identified based the lookup field and the non-lookup field.

\* \* \* \* \*